(12) United States Patent
Michiel

(10) Patent No.: US 6,724,766 B2
(45) Date of Patent: *Apr. 20, 2004

(54) METHOD AND ARRANGEMENT FOR PRIORITIZED DATA TRANSMISSION OF PACKETS

(75) Inventor: Herman Michiel, Meerbeek (BE)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/090,589

(22) Filed: Jun. 4, 1998

(65) Prior Publication Data

US 2002/0057706 A1 May 16, 2002

(30) Foreign Application Priority Data

Jun. 20, 1997 (EP) .............................. 97401433

(51) Int. Cl.⁷ .............................................. H04L 12/54
(52) U.S. Cl. ...................... 370/412; 370/429; 370/461; 710/36; 710/52
(58) Field of Search .................... 370/235, 412, 370/414, 416, 418, 462, 461, 429, 252; 710/36, 39, 52

(56) References Cited

U.S. PATENT DOCUMENTS

| 5,218,676 | A | * | 6/1993 | Ben-Ayed et al. ........... 395/200 |
| 5,231,633 | A | * | 7/1993 | Hluchyj et al. .............. 370/429 |
| 5,402,423 | A |   | 3/1995 | Van Kersen et al. |
| 5,434,984 | A |   | 7/1995 | Deloddere et al. ........... 395/325 |
| 5,517,495 | A | * | 5/1996 | Lund et al. .................. 370/399 |
| 5,533,009 | A | * | 7/1996 | Chen ........................... 370/232 |
| 5,765,032 | A | * | 6/1998 | Valizadeh .................... 709/235 |
| 5,870,629 | A | * | 2/1999 | Borden et al. ................ 710/44 |
| 5,923,656 | A | * | 7/1999 | Duan et al. .................. 370/395 |
| 5,931,924 | A | * | 8/1999 | Arimilli et al. .............. 710/41 |
| 5,991,812 | A | * | 11/1999 | Srinivasan ................... 709/232 |
| 6,072,805 | A | * | 6/2000 | Molnar ........................ 370/462 |
| 6,091,709 | A | * | 7/2000 | Harrison et al. ............. 370/235 |
| 6,108,307 | A | * | 8/2000 | McConnell ................... 370/235 |
| 6,359,861 | B1 | * | 3/2002 | Sui et al. ..................... 370/230 |

FOREIGN PATENT DOCUMENTS

| EP | 0562222 | 9/1993 |
| EP | 0584405 | 3/1994 |

OTHER PUBLICATIONS

"Priority Control ATM for Switching Systems" C. Oh et al, IEICE Transactions on Communications, vol. E75–B, Sept. 1992 No. 9, Tokyo, Japan, pp. 894–904.

"Queueing Disciplines for Integrated Fast Packet Networks" by M.G. Hluchy et al, Discovering a New World of Communications, Supercomm/International Conference on Communications '92, Chicago, Jun. 14–18 1992, vol. 2, pp. 990–996.

"Weighted Queueing Algorithm for Efficient Asynchronous Transfer Mode Trafic Shaping" IBM Technical Disclosure Bulletin vol. 39, No. 4, Apr. 1996, pp. 161–164.

* cited by examiner

Primary Examiner—Steven H. D Nguyen
Assistant Examiner—Roberta Stevens

(57) ABSTRACT

A method and arrangement for prioritized transmission of packets from a plurality of storage queues, each interfacing one corresponding input bitstream to one common transmission medium, is disclosed, whereby the respective queue priorities, on the basis of which access to the common transmission medium is determined, are itself dependent upon respective weigths associated to the corresponding input bitstreams. This dependency on these respective weight; relates to a respective amount of successive values of these respective queue priorities, to be selected from an arbitrary interval and sorted in a predetermined sequence.

12 Claims, 1 Drawing Sheet

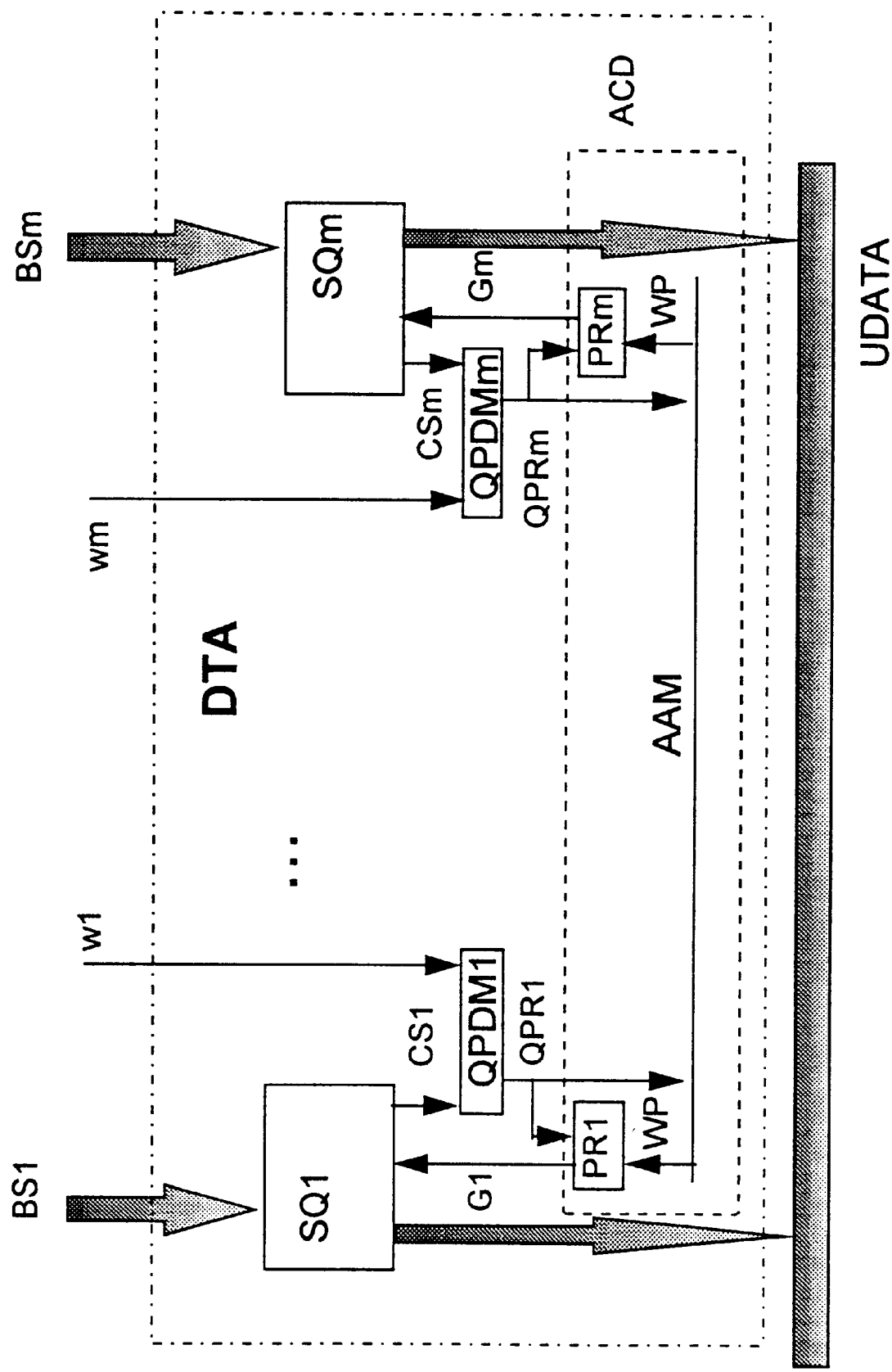

METHOD AND ARRANGEMENT FOR PRIORITIZED DATA TRANSMISSION OF PACKETS

BACKGROUND OF THE INVENTION

1. Technical Field

The present invention relates to a method and an arrangement for prioritized data transmission of packets from a plurality of storage queues, each interfacing one corresponding input bitstream to one common transmission medium, said method including a step of determining a respective queue priority for each respective storage queue, on the basis of which access to said common transmission medium is determined in accordance to a predetermined access criterion. The present invention also relates to a queue priority determining means, an access criterion and an access control device, such as those disclosed in the new as those disclosed in the new method and arrangement described in detail below.

2. Discussion of Related Art

Such an arrangement for performing said method is already known in the art, e.g. from the published European patent application, "Data transmission system and interface module and priority generating means included therein," publication number 0584405 A1, also available as Van Kersen, et al. (U.S. Pat. No. 5,402,423). Therein, a data transmission system including a plurality of interface modules (LIM1, ... ,LIM8), each interfacing a plurality of input bitstreams (TI11, TI12) with a common transmission medium (DB), is described, whereby each interface module includes storage means (FIFO1, FIFO2) as well as a packet priority determining means (C1,C2) for determining a packet priority for each of the received packets. Within one interface module, the packet priorities are used in a priority generator (PG) for further determining an interface module priority (PR1), on the basis of which access to the transmission medium (DB) is determined by means of processing units (PR) included in each module and by means of an access bus (AB) included in the data transmission arrangement. The combination of these processing units and the access bus thus corresponds to an access control device adapted to receive from each respective queue priority determining means said respective queue priority and to determine therefrom, in accordance with a predetermined access criterion, which storage queue of a first plurality of storage queues gets access to the common transmission medium. In the special case, where a packet priority determining means for generating the packet priority, is attributed to one single storage queue, and where each interface module merely interfaces one input bitstream with the common transmission medium, the prior art arrangement corresponds to arrangement for prioritized data transmission of packets from a first plurality of storage queues included in the arrangement, each interfacing one corresponding bitstream to one common transmission medium coupled to the plurality of storage queues, the arrangement including a second plurality of queue priority determining means, each respective queue priority determining means of the second plurality being associated with a respective storage queue of the first plurality and adapted to determine a respective queue priority, the arrangement further including the above-mentioned access control device, the arrangement for realizing the method described in the Technical Field above. Indeed, in this special case, the packet priority determining means and the priority generator of the prior art document together correspond to the above-described queue priority determining means, whereby both the packet priority and the interface module priority correspond to the above-described queue priority.

The prior art method and arrangement are suited for determining a packet priority, and in the above mentioned simple configuration, a storage queue or interface module priority, on the basis of which access to the common transmission medium is determined. In the prior art arrangement, these packet priorities are determined as a function of the storage time of the packets in the storage queues and of at least one packet characterizing parameter. Examples of such a packet characterising parameter are referenced in the prior art document in column 2, lines 4–9, as being for instance the packetizing delay and/or the type of information contained in the analogous data packets filling the queue. The prior art arrangement however does not provide a solution for granting access to one of several identical storage queues, each receiving simultaneously a similar data input stream. This situation is for instance present in access multiplexers, where in the upstream direction similar bitstreams carrying identical type of data packets and pertaining to identical quality of service categories, are competing for getting access on one common data bus. The prior art method and arrangement does not provide any solution for fairly granting access to one of these apparently similar bitstreams, arriving simultaneously at the different storage queues.

SUMMARY OF THE INVENTION

An object of the present invention is thus to provide a method and an arrangement for prioritized transmission of packets from a plurality of storage queues, each interfacing one corresponding input bitstream to one common transmission medium as described in the above mentioned prior art document, but which provides a means for fairly determining access among similar input bitstreams, whereby this similarity is both related to content as well as to connection parameters associated with these bitstreams.

According to the invention, this object is achieved by the fact that the queue priorities on the basis of which access is determined, are dependent upon a respective weight associated to each corresponding bitstream.

In this way, by attributing a weight to apparently similar input bitstreams, entering at distinct storage queues, and by letting the priorities on the basis of which access is determined, to also be dependent upon these weights, a method for prioritized weighted access allowing to favor or discriminate some of these similar bitstreams with respect to the others, is realized.

Another characteristic feature of the present invention is that the dependency of the respective queue priority upon the respective weight relates to a respective amount of successive values of the respective queue priorities, the respective amount of successive values being a respective set of the respective amount of distinct values, selected within an interval and sorted out in a predetermined sequence, with Pmin being a first real number lower than a second real number Pmax, the predetermined access criterion thereby being related to the predetermined sequence.

In this way, by relating an amount of successive queue priorities with a weight, and by relating the access criterion with the sequence said successive priorities are sorted out, a bitstream with a relatively higher weight, will have a higher probability for accessing the transmission medium than a bitstream with a relatively lower weight, as will be explained more into detail in further paragraphs.

An additional characteristic feature of the present invention is that the respective queue priority is reset at respective predetermined instances related to the respective weights, to a respective value at a predetermined position of the respective set.

Resetting the respective priorities at predetermined instances, results in priority cycles, during which, for each respective storage queue, the respective amount of priorities are compared, as will be explained more into detail in further paragraphs. Since the generation of each new priority is in fact related to the transmission of at least one packet from the associated storage queue, as was already known from the prior art arrangement, the subject method thus results in transmitting, for each storage queue, an amount of packets, directly related to its weight, during such a cycle. This means that the thus obtained method is not only simple, but guarantees, during each cycle, a fair access to the transmission medium for each respective storage queue, in relation to the respective weight of the corresponding bitstream.

Yet another characteristic feature of the present invention is that the respective amount is determined as the integer most approximating the product of said respective weight and a normalization factor.

In this way, a very simple relationship between the amount of values to select from said interval and said respective weights is obtained, thus resulting in a very simple and cheap arrangement.

Still a further characteristic feature of the present invention is that the normalization factor is determined as a value not lower than the maximum between the inverse value of a predetermined resolution of the weights and the inverse value of a predetermined minimum limit value of the weights, whereby 1 added to the product of the width of said interval and the inverse value of a predetermined resolution of the priorities is not lower than the product of a predetermined maximum limit value for the respective weights and the normalization factor.

Thereby, the general relationships for any predetermined value of the minimum and maximum limits of the weights and the resolutions of the priorities and the weights allow to determine appropriate values for said normalisation factor and for the limits of the interval.

Yet a further characteristic feature of the present invention is that for respective amount being larger than 1, said respective amount of distinct values are equidistantly spaced over the total width of the interval.

In this way, by letting the respective successive priorities associated to the corresponding bitstreams to be equidistant numbers spread over the entire width of the interval [Pmin, Pmax], jitter is decreased as much as possible. Indeed, by smoothly distributing the priority values over the available range, a maximum variation among the different users is obtained.

BRIEF DESCRIPTION OF THE DRAWING

The above mentioned and other objects and features of the invention will become more apparent and the invention itself will be best understood by referring to the following description of an embodiment taken in conjunction with the accompanying drawing which depicts an embodiment of an arrangement according to the invention.

DETAILED DESCRIPTION OF PREFERRED EMBODIMENTS

An arrangement DTA for performing the subject method is depicted in the FIGURE. This arrangement DTA is adopted to receive m input bitstreams, m being an integer not lower than 2. The bitstreams are respectively denoted BS1 to BSm, each respective one having an associated weight, denoted w1 to wm, carried by identically named weight input signals, being input signals to the arrangement. Data pockets of each respective input bitstream BS1 to BSm are temporarily stored in respective storage queues denoted SQ1 to SQm, before being transmitted towards a common transmission medium, denoted UDATA. Each respective storage queue SQ1 to SQm is further associated to a respective queue priority determining means, denoted QPDM1 to QPDMm, included in the arrangement and adapted to generate a respective queue priority, QPR1 to QPRm. These queue priorities are used for determining which one of the m storage queues may transmit a data packet to the common transmission medium UDATA. This access arbitration is performed by an access control device, denoted ACD, of which various embodiments are known in the art. An embodiment of such an access control unit, as shown in the FIGURE and similar to the one of the already referenced prior art documents, consists of an access interface, denoted AAM and being adapted to receive from each of the queue priority determining means QPDM1 to QPDMm the corresponding queue priorities QPR1 to QPRm, and to determine therefrom, in accordance to a predetermined access criterion, a winning priority denoted WP. This winning priority WP is then sent back towards m processing units, respectively denoted PR1 to PRm, included in the access control device ACD and associated to a respective storage queue SQ1 to SQm. These processing units are adapted to receive, besides the winning priority signal WP sent by the access interface AAM, also the respective priorities PR1 to PRm from the respective queue priority determining means QPDM1 to QPDMm. Furthermore, each respective processing unit is further adapted to compare both received input values, and to determine therefrom the value of a respective control signal, denoted G1 to Gm, being indicative of whether the associated respective storage queue SQ1 to SQm may transmit at least one data packet towards the common transmission medium UDATA. However other embodiments for determining the access arbitration based on the individual queue priorities exist, as is well known by a person skilled in the art. Since detailed realizations of such access control units are beyond the scope of this document, they will not be further described.

The invention concerns the method used for determining the respective queue priority values QPR1 to QPRm, in relationship to the predetermined access criterion. The method basically consists of determining, for each respective storage queue SQ1 to SQm, a respective amount, being a respective positive integer number, denoted K1 to Km, and determining this respective amount of successive queue priorities as a respective set of distinct values selected from a real interval [Pmin,Pmax], and sorted out in a predetermined sequence. The predetermined access criterion is thereby related to this predetermined sequence.

The interval [Pmin,Pmax] from which the respective queue priorities are selected, is identical for all storage queues. The limit values of this interval, Pmin and Pmax, are real numbers, with Pmin being lower than Pmax. These limit values of this interval are identical for all respective storage queues, and are in some embodiments determined by the user, during initialization of the arrangement. In most embodiments however, Pmin and Pmax are design parameters, thereby imposing some absolute limits when choosing Pmin and Pmax. These absolute limits are generally used, since these allow for the largest flexibility for the weight values, as will become clear from further paragraphs. However selecting these limits is not mandatory. In either case, once Pmin and Pmax are determined, they are stored into a memory included in each queue priority determining means QPDM1 to QPDMm. More details about how to determine these values will be discussed in a further paragraph of this document.

In some embodiments, a distinct queue priority is determined and transmitted from the queue priority means towards the access control unit, ACD each time a new packet is to be transmitted from the associated storage queue. This means that for bitstream Bm, the Km successively decreasing priority values, denoted here PRm1,PRm2, ..., PRmKm are determined for Km successive packets to be transmitted from queue SQm. Each respective queue priority determining means QPDM1 to QPDMm is therefore informed by its respective storage queue SQ1 to SQm about a packet being sent, by means of respective control signal CS1 to CSm.

In other variant embodiments however, a queue priority may be associated to the transmission of a predetermined or programmable amount of packets to be transmitted. Thus each time one queue priority is selected as the winning priority, the associated storage queue may then transmit this predetermined amount of successive packets, instead on only one. Since this extension is easily realized by the addition of extra circuitry to the arrangement, which is well known to a person skilled in the art, and since this is not really relevant to the invention, the remainder of the document will only consider the case of one data packet being transmitted when the corresponding priority is the winning priority.

For each respective storage queue or bitstream BS1 to BSm, the respective amount K1 to Km of successively determined queue priority values, is related to the respective weights, w1 to wm, as input on the similarly named weight input lines. These weight values are real numbers, larger than 0. For any arbitrary bitstream BSi (not shown on the FIGURE), the relationship between the respective amount Ki and the respective weight wi is very simple and consists of multiplying the respective weight wi with a normalization factor NF, in accordance to formula (1):

$$Ki = wi \cdot NF \qquad (1)$$

This normalization factor NF is dependent upon the resolution of the weights, denoted Rw, being a predetermined minimum distance between two consecutive weight values. This normalization factor is further limited by a predetermined minimum limit value for the weights, denoted wmin. This relationship being formalized by:

$$NF >= \max\{1/Rw, 1/wmin\} \qquad (2)$$

whereby >= indicates larger than or equal to,
1/Rw is the inverse of the predetermined resolution Rw of the weights,
1/wmin is the inverse of the predetermined minimum limit value wmin for the weights.

This formula (2) is obtained by considering that a minimum allowed difference in weight values, as expressed by their resolution Rw, still has to result in a distinct amount of values, thus resulting in a minimum difference of 1. On the other hand, in the extreme case of a predetermined minimum limit value wmin for the weights, being lower than the predetermined resolution of the weights, even this bitstream should be able to get access, expressed by the fact that NF.wmin >=1. By combining both requirements, formula (2) is obtained, stating that NF may not be lower than the maximum from 1/wmin and 1/Rw.

The exact relationship between the interval width (Pmax−Pmin), the predetermined limit values of the weights, wmin and wmax, and the resolution of the priorities, denoted Rp and corresponding to the minimum distance between two consecutive priority values, is given by the following formula (3), $$NF.wmax <= [(Pmax - Pmin) \cdot 1/Rp] + 1 \qquad (3)$$

whereby <= indicates lower than or equal to
1/Rp is the inverse value of the predetermined resolution Rp of the priorities,
this formula (3) reflecting that the maximum amount of distinct values to be selected from the interval [Pmin,Pmax] has to be lower than the number of priorities available within the interval [Pmin,Pmax].

From these formulas the boundary values for NF, Pmin, Pmax, and Rp can be determined, if the predetermined limit conditions of the weights are known on beforehand. The value of NF can be determined, for instance by means of a separate device included in the arrangement DTA. This device is adapted to receive the predetermined values of wmin and Rw, and to generate therefrom a value of NF, for transmitting this to a second device adapted to determine Pmin, Pmax and Rp from NF and wmax. In the opposite case of predetermined design limits for Pmin, Pmax and Rp, the boundary values for the weights may be derived, once a value for NF is selected, for instance by a person using this arrangement. In the arrangement depicted in the FIGURE, the predetermined limit values of Pmin, Pmax and Rp are used, whereby a user has the freedom to select NF in accordance to formulas (2) and (3). In this case, Pmin, Pmax and Rp are design parameters stored in a memory location within or even inherent to each queue priority determining means, as will become clear from a further paragraph. Once the user has made a selection for NF, this value is programmed and stored within each queue priority determining means. Remark that the chosen value for NF, has to be applied for all queue priority determining means.

The principle for selecting the respective amount of priorities is illustrated in the following example, where 3 bitstreams BS1, BS2 and BS3, with associated weights w1=2, w2=3 and w3=5 are competing for access. The resolution for the weights Rw is 1 and is equal to the minimum weight limit wmin. The maximum weight limit wmax is 5. In this example, the limit values of the weights are thus known.

K1, K2 and K3 successive priorities attributed to each associated storage queue SQ1, SQ2, SQ3 are now to be selected from an interval [Pmin,Pmax].

The normalization factor NF has to be larger than or equal than 1 according to formula (2). Thus, in principle, any value not lower than 1 may be chosen as normalization factor, either being a real or integer value. The choice of a value of NF, will however also determine some restrictions for determining the limit values of the interval and the resolution of the priorities, as was clear from formula (3). In this example NF will be chosen as 1. This means that respectively 2, 3 and 5 distinct values are to be selected from an interval, and arranged in a predetermined order. In this example a descending order is used.

Formula (3) gives the boundary restrictions for the determination of the interval. In fact a lot of different choices are possible. In case of a resolution of 1 for the priorities, the priorities are integer numbers and Pmax−Pmin has to exceed 4. The interval [1,5] can then for instance be used as well as the interval [10,15] or even the interval [100,1000], since the restrictions only refer to the minimum width. In case of a smaller resolution of the priorities, for instance 0.1, even real values within the interval [0,1], or even negative real values within the interval [−4,−3], are possible, although for practical reasons negative values will rarely be used.

If the resolution of the priorities is chosen to be 1, and if the interval [1,5] is chosen, 2 successive integer priorities for successive packets to be transmitted from SQ1 may be chosen as 5,4 but nothing excludes to choose 2,1 or 4,2. In this example the values 2,1 are chosen.

Similarly, for BS2, 3 successive integer priority values from the interval [1,5] may be 3,2,1 or 5,3,1 or any set of 3 distinct integer values, sorted in decreasing order, from the interval [1,5]. The set 3,2,1 is chosen.

For bitstream BS3, there is only one way for selecting 5 distinct integer values, in descending order, from the interval [1,5], namely 5,4,3,2,1, since the interval boundaries correspond to the limit value expressed by formula (3).

The access criterion determining access to one of the storage queues based on their respective queue priorities, is related to the chosen sequence for ordering the distinct values from the interval, as this sequence represents successive respective queue priorities. In the example where the values were put in descending order, the access criterion basically consists of selecting the highest queue priority among all respective queue priorities as the winning priority, whereby the corresponding storage queue is granted the access. The winning priority WP is thus the highest among the respective priorities QPR1 to QPRm.

In case of two or more storage queues with equal maximum priorities, ca second selection has to be performed, this second selection being possibly related to a physical position of the storage queues or related slots on a board, as is mentioned in the published European Patent Application, publication number 0562222A1. Since this second selection is however outside the scope of this document, further implementation details will not be described in this document.

These sequences of respective queue priorities will then be further repeated at respective predetermined instances, related to the respective weights, as long as this respective weight has not changed. In general, since the value of these respective weights may vary in time, the respective queue priorities are reset at respective predetermined instances, to one of the values of the respective sequence, this respective sequence thereby corresponding to the actual value of the respective weight at this particular instance. Indeed, since the weight can vary in time, the number of values to be selected from the interval can vary as well, this resulting in a sequence being different from the previous one. And, even in case the respective weight has not changed, an alternative sequence of successive values may be chosen within the interval, at these predetermined instances. In general the first value of the new or actual sequence is selected for resetting to, but this is not always the case. For implementing this principle, several alternatives can be used. Two of them will be described, although they are not exhaustive.

A first alternative, performed by a first variant embodiment of the arrangement, consists of continuously repeating the first determined sequence of consecutive queue priorities, as long as the value of the respective weight does not change, and as long as the corresponding storage queue is not empty. Thus for an arbitrary storage queue SQi (not shown on the FIGURE), successive consecutive groups of Ki queue priorities are continuously determined, resulting in the following succession of values: QPRi1, QPRi2, ... , QPRiki, QPRi1, QPRi2, ... , QPRiki, QPRi1, QPRi2, ... , QPRiki etc. This means that for each new successive groups of Ki packets to be transmitted, the same priorities are applied in the same order, without interruption, as long as storage queue SQi is filled and as long as wi is not changed.

In case of successive queue priorities put in descending order, the access criterion related to the first alternative method in this case not only consists of determining the winning priority WP to be the highest queue priority among all respective queue priorities, but also not exceeding an aim priority. Once the winning priority is determined, the aim priority is changed to the value of the thus obtained winning priority. When it is detected by the access control device ACD that all respective queue priorities are higher than the aim priority, the latter is reset to Pmax.

The initial value of this aim priority may be set at Pmax, but this is not mandatory.

In the previous example, applying this first alternative method will result in the following queue priorities:

BS1: 2,1,2,1,2,1,2,1,2,1,2,1, . . . etc.
BS2: 3,2,1,3,2,1,3,2,1,3,2,1, . . . etc.
BS3: 5,4,3,2,1,5,4,3,2,1,5,4, . . . etc.

The related access criterion will then result in the following access sequence first BS3 gets the access because of its highest priority value (5), the aim is determined to be 5,
next BS3 again wins the access, because of its highest priority (4), the aim is changed to 4,
next both BS2 and BS3 have the highest priority, in this case a further discrimination has to take place by a second access criterion as was previously described. This may for instance be based on the position, as was previously described as well. Suppose that for this second access criterion BS3 then gets priority over BS2 which gets priority over BS1.
BS3 thus wins. The aim becomes 3.
next BS2 is served, the aim is not changed.
next BS1,BS2,BS3 all have the winning priority (2). BS3 thus gets the access, the aim is changed to 2.
next BS2 gets access, aim is not changed,
next BS1 gets access, aim still not changed,
next BS3 is granted access. The aim is changed to
BS2 and BS1 are then consecutively granted access, despite the higher priority value of BS3. However this value (5) exceeds the aim.

After BS1 has won the last access, the next competing priorities are 2,3, and 5, all definitely higher than the last updated aim value of 1. From that moment on, the aim priority is reset to 5 by the access control device, and the some procedure is repeated.

As a matter of fact, this first alternative method has introduced a sequence of priority cycles, in time separated by the resetting of the aim priority to Pmax, where this time is determined by the sum of all respective amounts, thus also the sum of all respective weights. Since the values of the weights may vary in time, and since new bitstreams may become activated or added, the duration of each of these cycles may thus vary as well.

From this example, one can also conclude that in the first priority cycle SQ1 has sent 2 packets, SQ2 has sent 3 packets and SQ3 has sent 5 packets, which is exactly corresponding to a distribution of the bandwidth in accordance to the weights, during this cycle. Thus a fair and weighted access arbitration scheme is established during each priority cycle by this method.

It is also observed that during this cycle BS3 has sent 3 consecutive packets, this resulting in a rather bursty transmission of data. In order to reduce this, the respective priority values are selected as equidistant values spread over the entire width of the interval [Pmin,Pmax]. For any arbitrary storage queue SQi, this distance may be obtained by dividing the interval width (Pmax−Pmin) by (Ki−1), and attributing respective queue priorities to SQi starting from Pmax, Pmax(Pmax−Pmin)/(Ki−1), Pmax−2(Pmax−Pmin)/(Ki−1)..., and ending with Pmin+(Pmax−Pmin)/(Ki−1), Pmin, and continuously repeating the same sequence as long as the value of the weight wi does not change. Another possibility consists of selecting the following sequence: Pmax−(Pmax−Pmin)/2Ki, Pmax. 3(Pmax−Pmin)/2Ki, ..., Pmin+3(Pmax−Pmin)/2Ki, Pmin+(Pmax−Pmin)2Ki.

In the first variant embodiment, adapted for performing this first alternative method, the respective queue priority determining means QPDM1 to QPDMm include a device adapted to determine the respective amounts K1 to Km from the normalization factor NF and from the respective weights, input to these respective queue priority determining means. Each respective queue priority determining means further includes a selection device for selecting, or calculating in case of equidistant values, the thus determined respective amount of values from the predetermined interval of which the limits were stored in a memory included within each queue priority determining means. Each queue priority determining means further includes means for sorting out the selected values in the appropriate sequence, and the necessary control logic for outputting a next priority value from the thus obtained sequence, upon a packet being sent from the associated storage queue. They further include means for resetting their respective queue priority back to the first one of the sequence upon detecting that a cell was sent while the queue priority was the last one of the sequence. In case of equidistant priorities, the queue priority determining means may be simpler, including a rotating counter, counting down, starting at for instance Pmax, with an decrement of (Pmax−Pmin)/(Ki−1), and upon detecting that a packet was sent while the priority was at its minimum value Pmin, starting again. In this case, Pmax and Pmin are thus inherent design parameters of the counters of the queue priority means themselves. In these embodiments, the queue priority determining means further include a device for calculating the respective decrement values of their counters, from the value of NF and the respective weights.

In case of the second mentioned sequence for having equidistant values, the limit values of the counters need to be adaptable as well, resulting in more complex embodiments.

The access control unit adapted for performing this first variant of the method needs to include the necessary devices adapted to determine the aim priority, and to further adopt it, in accordance with the previously described first variant of the method. Since a person skilled in the art is further adapted to realize detailed implementations from the above described functional description of the access control device and the queue priority determining means, further details will not be described in this document. It however needs to be remarked that in all possible implementations, necessary control logic is to be foreseen for synchronizing the different signals present in the arrangement. Again, this kind of circuitry is commonly known to a person skilled in the art and will therefore not be further described in this document.

A second alternative, realised by a second variant of the embodiment, consists of also continuously repeating the first determined sequence, while however inserting an auxiliary priority Paux, between two consecutive sequences. Again, this repetition is only performed on the condition that the value of the respective weights does not change and that the associated storage queue does not gets empty. Thus for an arbitrary storage queue SQi (not shown on the FIGURE), basically successive consecutive groups of Ki+1 queue priorities are continuously generated, resulting in the following succession of values: QPRi1,QPRi2, ..., QPRiKi, Paux,QPRi1,QPRi2, ..., QPRiKi, Paux, etc.

In case of successive queue priorities QPRi1 to QPRiKi put in descending order, the access criterion related to the second alternative method merely consists of selecting the highest queue priority amongst all respective queue priorities, whereby however in case the winning priority WP is determined to be Paux, all storage queues are inhibited from transmitting a packet, and each queue priority determining means has to reset its respective queue priority to the first one of its respective sequence. To this purpose, all queue priority determining means are informed upon the fact that WP=Paux, by means of a separate control signal (not shown on the FIGURE), generated by the access control device ACD.

The auxiliary priority Paux has to lie outside the interval [Pmin,Pmax]; in the case of successive priority values sorted out in descending order, Paux has to be smaller than Pmin.

In the previous example, applying this second alternative method whereby Paux is arbitrary chosen to be 0.5, the following queue priorities result
BS1: 2,1,0.5,2,1,0.5,2,1,0.5, etc
BS2: 3,2,1,0.5,3,2,1,0.5,3,2,1,0.5 etc.
BS3: 5,4,3,2,1,0.5,5,4,3,2,1,0.5, etc The access criterion related to this second alternative method will then result in the following access sequence: BS3,BS3,BS3,BS2,BS3,BS2,BS1,BS3, BS2,BS1. During the next comparison period, all three queue priorities will have the value 0.5, which is now determined to be the winning priority WP. The access control device thereby inhibits all storage queues from transmitting a data packet and generates an extra control signal for transmission to all queue priority determining means, which then, upon receiving this signal, reset themselves for generating the first value of the original sequence etc.

Again, this second alternative method has resulted in a sequence of priority cycles, during which successive values of the K1, ..., Km priorities are compared. In this case, the onset of such a priority cycle is not determined by the value of an aim priority, but by the value of the winning priority WP, which, upon being equal to Paux, triggers the simultaneous resetting of the individual storage queue priorities itself. Again, one may notice that during this priority cycle, BS3 has transmitted 5 packets, BS2 has transmitted 3 packets and BS1 has transmitted 2 packets. This principle again results in a fair distribution of the fairness, based on the values of the weights at that moment.

The queue priority determining means adopted for performing this second alternative of the method is basically similar to the one performing the first alternative method, but includes additional means adapted to insert the auxiliary priority value after each determined set of values within the interval [Pmin,Pmax], and other additional means for resetting itself to the first value of the sequence upon receiving the extra control signal from the access control device indicating that the winning priority is Paux. This access control device of this second variant embodiment does not include means for determining the aim priority, as was the case for the first variant embodiment, but includes the necessary circuitry for generating control signals to all queue priority determining means upon detecting that WP is Paux, and means for inhibiting all storage queues from transmitting a data packets upon detecting the same.

Other, more sophisticated extensions or deviations from this second alternative method, realized by yet other variant embodiments, are possible as well. One of them provides the possibility that, even in the case that WP=Paux, one of the storage queues having a queue priority being Paux, may transmit a packet, after which step all queue priorities are reset to the first value of their respective sequences, except for the storage queue just having transmitted the packet. This particular one is then immediately reset to the second one of its range.

In all variants of the second alternative method, the duration of a priority cycle is still again determined by the sum of the respective amounts of successive priorities from the interval [Pmin,Pmax], which is related to the sum of the respective weights at the onset of this priority cycle. The exact duration of these cycles is further determined by implementation details of the access control device, queue priority determining means, and the storage queues themselves, which are all synchronized by synchronization logic included in the arrangement (not shown on the FIGURE).

This second alternative method in principle also allows to choose at the onset of each new cycle, a different set of values from the interval, or even to update the interval. The same could however be realized with the first alternative method, at the start of a new cycle. Since these extensions however involves extra complex circuitry, and since they do not bring any advantage to the invention, these extensions are hardly used.

As for the first alternative, burstiness is seriously reduced by taking equidistant values for the respective successive priorities determined within one cycle. The same values as previously mentioned for the first alternative may be used.

For both alternatives, the amount of packets being transmitted during one priority cycle from one particular storage queue SQi, is thus directly proportional to the weight wi of the corresponding bitstream. The ratio between the share of bandwidth between 2 individual bitstreams BSi and BSj (not shown on the FIGURE), is therefore also directly proportional to the ratio between their respective weight; wi and wj. Fairness is thus obtained. In case of more complex embodiments where more than one pocket is transmitted from a storage queue with the winning priority, it is mandatory for guaranteeing fairness that the amount of packets transmitted from each queue that won the access, is the same, when using the subject method.

The subject method is especially valuable for dividing the remaining bandwidth, according to a specific weight, among the active users of the Unspecified Bit Rate, abbreviated by UBR, service category. This kind of service category is standardized by the ATM forum and intended for non-real time applications such as file-transfer and electronic mail and is in fact a best-effort service, for which only the residual bandwidth, remaining after other, well-specified quality of service categories are served. Nevertheless, it may be the wish of the telecom operator to yet control the partition of this available bandwidth among the active users of this UBR category, thereby favoring some users with respect to others, for instance based on a different tariffing rate. In the latter case, the users prepared to pay more are offered a relative larger share of the remaining bandwidth. As a matter of fact, these difference in tariffing schemes results in a difference in relative weights the operator has attributed to these users for these connections.

In general, these weights on the basis of which an operator may wish to discriminate among several user are not necessarily related to the tariffing, but may in other situations may as well be related to other characteristics of the users such as their profile (business, domestic etc.) or to their fidelity. These reasons however are outside the scope of the invention, and will therefore not be further discussed.

It further needs to be remarked that the queue priority generating means only output a value of the determined sequence for non-empty queues. In case of an empty queue, a predetermined empty-queue priority, having a predetermined value being lower than Pmin or even Paux for the second alternative method, can then for instance be used. The necessary circuitry for generating this is rather trivial and will therefore not be further described. All described variants of the method, as well as all described embodiments of the arrangement, easily allow for new connections or bitstreams, with associated new weights, to be added or activated, while yet preserving fairness. Indeed, as long as the weights of the newly added or activated bitstream lie within the predetermined weight limits [wmin,wmax], a corresponding amount of queue priorities may be determined according to formulas (1), (2) and (3). For the second alternative, new or newly activated connections will start with priorities at Paux, for synchronizing reasons. Whenever a new cycle is started, their priorities will be automatically be reset to the first value of the sequence, according to the second alternative method. The delay that is encountered is only low and can be afforded. With the first alternative, when a new bitstream becomes activated, in order to preserve fairness, transmitting its determined sequence of priority values has to be postponed to the onset of the next priority cycle, by extra circuitry to be added to for instance the queue priority determining means.

It further needs to be remarked that, instead of selecting the respective amount of queue priorities from the interval [Pmin,Pmax] and putting them in descending order, they may as well be put in ascending order. In the latter case, the access criterion of course has to be changed such that the lowest among all priorities is selected for determining the winning priority. All variants of the method, described for the case of descending priorities, may now as well be applied to the case of ascending priorities, whereby some slight changes have to be introduced, e.g. the aim priority needs to be reset to Pmin in the first variant of the method, and in the second variant of the method the auxiliary priority value Paux now has to be higher than Pmax. The necessary changes for adapting the different embodiments to the case of ascending priority values are rather trivial and will therefore not be further described into detail.

While the principles of the invention have been described above in connection with specific apparatus, it is to be clearly understood that this description is made only by way of example and not as a limitation on the scope of the invention.

What is claimed is:

1. Method for prioritized transmission of packets from a plurality of storage queues (SQ1, . . . ,SQm), each interfacing one corresponding input bitstream (BS1, . . . ,BSm) to one common transmission medium (UDATA), said method including a step of determining a respective queue priority (QPR1, . . . ,QPRm) for each respective storage queue (SQ1, . . . ,SQm), on the basis of which access to said common predetermined access criterion, characterized in that said respective queue priority (QPR1, . . . ,QPRm) is dependent upon a respective weight (w1, . . . ,wm), being a positive real number and associated with said corresponding input bitstream (BS1, . . . ,BSm), wherein the dependency of said respective queue priority (QPR1, . . . ,QPRm) upon said respective weight (w1, . . . ,wm) relates to a respective amount (K1, . . . ,Km) of successive values of said respective queue priorities (QPRl, . . . ,QPRm), said respective amount (K1, . . . ,Km) of successive values being selected within an interval (Pmin, Pmax) and sorted out in a predetermined sequence, with Pmin being a first real number lower than a second real number Pmax, said predetermined access criterion thereby being related to said predetermined sequence.

2. Method according to claim 1, characterized in that said respective queue priority is reset, at respective predetermined instances related to said respective weights, to a respective value at a predetermined position of said respective set.

3. Method according to claim 1, characterized in that said respective amount (K1, . . . ,Km) is determined as the integer most approximating the product of said respective weight (w1, . . . ,wm) and a normalization factor (NF).

4. Method for prioritized transmission of packets from a plurality of storage queues (SQ1, . . . ,SQm), each interfacing one corresponding input bitstream (BS1, . . . ,BSm) to one common transmission medium (UDATA), said method including a step of determining a respective queue priority (QPR1, . . . ,QPRm) for each respective storage queue (SQ1, . . . ,SQm), on the basis of which access to said common transmission medium (UDATA) is determined in accordance to a predetermined access criterion, characterized in that said respective queue priority (QPR1, . . . ,QPRm) is dependent upon a resepctive weight (W1, . . . ,wm), being a positive real number and associated with said corresponding input bitstream (BS1, . . . ,BSm), the dependency of said respective queue priority (QPR1, . . . ,QPRm) upon said respective weight (w1, . . . ,wm) relates to a respective amount (K1, . . . ,Km) of successive values of said respective queue priorities, said respective amount of successive values of said respective amount of distinct values, selected within an interval Pmin, Pmax) and sorted out in a predetermined sequence, with Pmin being a first real number lower than a second real number Pmax, said predetermined access criterion thereby being related to said predetermined sequence, said respective amount (K1, . . . ,Km) is determined as the integer most approximating the product of said respective weight (w1, . . . ,wm) and a normalization factor (NF), and said normalization factor is determined as a value not lower than the maximum between the inverse value (1/Rw) of a predetermined resolution (Rw) of said weights and the inverse value (1/wmin) of a predetermined minimum limit value (wmin) of said weights, whereby 1 added to the product of the width of said interval (Pmax−Pmin) and the inverse value (1/Rp) of a predetermined resolution (Rp) of said priorities is not lower than the product of a predetermined maximum limit value (wmax) for said respective weights and said normalization factor (NF).

5. Method according to claim 1, characterized in that for said respective amount (K1, . . . ,Km) being larger than 1, said respective amount of distinct values are equidistantly spaced over the total width of said interval (Pmin, Pmax).

6. Arrangement (DTA) for prioritized data transmission of packets from a first plurality of storage queues (SQ1, . . . ,SQm) included in said arrangement, each interfacing one correspnding input bitstream (BS1, . . . ,BSm) to one common transmission medium (UDATA) coupled to said plurality of storage queues, said arrangement (DTA) including a second plurality of queue priority determining means (QPDM1, . . . ,QPDMm), each respective queue priority determining means (QPDM1, . . . ,QPDMm) of said second plurality being associated with a respective storage queue (SQ1, . . . ,SQm) of said first plurality and adapted to determine a respective queue priroity (QPR1, . . . ,QPRm), said arrangement (DTA) further including an access control device (ACD) adapted to a receive from said each respective queue priority determining means (QPDM1, . . . ,QPDMm) said respective queue priority (QPR1, . . . ,QPRm) and to determine therefrom, in accordance to a predetermined access criterion, which storage queue of said first plurality gets access to said common transmission medium (UDATA), characterized in that said each representative queue priority determining means (QPDM1, . . . ,QPDMm) is further adapted to determine said respective queue priority (QPR1, . . . ,QPRm) from a respective weight (w1, . . . ,win), being a positive real number and associated with said corresponding input bitstream (BS1, . . . ,BSm), wherein said each respective queue priority determining means (QPDM1, . . . ,QPDMm) is further adapted to determine a respective amount (K1, . . . ,Km) of successive values of said respective queue priorities (QPR1, . . . ,QPRm), the respective amount (K1, . . . ,Km) being selected within an interval (Pmin, Pmax), and sorted out in a predetermined sequence, said respective amount (K1, . . . ,Km) thereby being dependent upon said respective weight (w1, . . . ,wm) associated with said corresponding input bitstream (BS1, . . . ,BSm), and Pmin being a first real number smaller than Pmax being a second real number, whereby said predetermined access criterion is related to said predetermined sequence.

7. Arrangement according to claim 6, characterized in that said each respective queue priority determining means (QPDM1, . . . ,QPDMm) is further adapted to reset said respective queue priority at respective predetermined instances related to said respective weights, to a respective value at a predetermined position, of said respective set.

8. Arrangement according to claim 6, characterized in that said each respective queue priority determining means (QPDM1, . . . ,QPDMm) is further adapted to determine said respective amount (K1, . . . ,Km) as the integer most approximating the product of said respective weight (w1, . . . ,wm) and a normalization factor (NF).

9. Arrangment according to claim 8, characterized in that said arrangement is further adapted to determine said normalization factor (NF) as a value not lower than the maximum between the inverse value (1/Rw) of a predetermined resolution (Rw) of said weights and the inverse value (1/wmin) of a predetermined minimum limit value (wmin) of said weights, and in that said arrangmeent is further adapted to determine said first real number Pmin and said second real number Pmax so that 1 added to the product of the width of said interval (Pmax−Pmin) and the inverse value (1/Rp) of a predetermined resolution (Rp) of said priorities is not lower than the product of a predetermined maximum limit value (wmax) for said respective weights, and said normalization factor (NE).

10. Arrangement according to claim 6, characterized in that said each respective queue priority determining means (QPDM1, . . . ,QPDMm) is further adapted to determine said respective amount of successive values of said respective queue priorities as equidistantly spaced real values over the total width of said interval (Pmin, Pmax), in case said respective amount is larger than 1.

11. A method for prioritized transmission of data packets from a plurality of storage queues (SQ1, . . . ,SQm) to a common transmission medium (UDATA), each storage queue serving as an interface from one corresponding input bit-stream (BS1, . . . ,BSm) to the common transmission medium (UDATA), wherein said method includes a step of determining a respective queue priority (QPR1, . . . ,QPRm) for each respective storage queue (SQ1, . . . ,SQm), the respective queue priority depending upon storage time in the respective storage queue and also depending upon at least one packet characterizing parameter, and wherein said method also includes a step of arbitrating access to the common transmission medium (UDATA) so that a storage queue is allowed access to transmit at least one data packet to the common transmission medium, the access arbitration being performed by an access control device in response to the respective queue priorities (QPR1, . . . ,QPRm) and according to a predetermined access criterion which, in case where there is a single highest queue priority, selects the highest queue priority as a winning priority, the method being characterized in that:

the respective queue priority (QPR1, . . . ,QPRm) also depends upon a respective weight (w1, . . . ,wm) which is a real number associated with the corresponding input bitstream (BS1, . . . ,BSm), and wherein the respective weights (w1, . . . ,win) corresponding to different input bitstreams are different in situations where the different input bitstreams have substantially similar storage times and packet characterizing parameters, the respective weights being assigned based upon characteristics of users instead of characteristics of packets.

12. Method for prioritized transmission of packets from a plurality of storage queues (SQ1, . . . ,SQm), each interfacing one corresponding input bitstream (BS1, . . . ,BSm) to one common transmission medium (UDATA), said method including a step of determining a respective queue priority (QPR1, . . . , QPRm) for each respective storage queue (SQ1, . . . ,SQm), on the basis of which access to said common transmission medium (UDATA) is determined in accordance to a predetermined access criterion, characterized in that said respective queue priority (QPR1, . . . ,QPRm) is dependent upon a respective weight (w1, . . . ,wm), being a positive real number and associated with said corresponding input bitstream (BS1, . . . ,BSm), and wherein the respective queue priority (QPR1, . . . , QPRm) is also a function of a storage time of packets in the respective storage queue (SQ1, . . . ,SQm) and of at least one packet characterizing parameter.

* * * * *

UNITED STATES PATENT AND TRADEMARK OFFICE
CERTIFICATE OF CORRECTION

PATENT NO.   : 6,724,766 B2
DATED        : April 20, 2004
INVENTOR(S)  : Michiel It is certified that error appears in the above-identified patent and that said Letters Patent is hereby corrected as shown below:

Title page,
Item [56], References Cited, please cancel lines 13 - 16 and insert corrected dates as follows:
-- 5,991,812 A   *3/1997    Srinivasan      709/232
   6,072,805 A   *6/1997    Molnar          370/462
   6,091,709 A   *11/1997   Harrison et al  370/235
   6,108,307    *12/1997    McConnell       370/235 --.
Item [57], ABSTRACT,
Lines 8 and 11, please cancel "weigths" and substitute -- weights -- therefor;

Column 13,
Line 41, please insert -- ( -- prior to "Pmin".

Column 14,
Line 65, please cancel "(NE)" and substitute -- (NF) -- therefor.

Column 16,
Line 3, please cancel "win)" and substitute -- wm) -- therefor.

Signed and Sealed this

Tenth Day of August, 2004

JON W. DUDAS
*Acting Director of the United States Patent and Trademark Office*